Nov. 13, 1962 W. J. WILLIAMS ETAL 3,063,709
MOUNT PIN AND SEALING HEAD FOR SEALING MACHINE
Filed Aug. 10, 1960 2 Sheets-Sheet 1

INVENTORS
WILLIAM J. WILLIAMS and
BERNARD W. GEFFKEN
BY
ATTORNEY.

Nov. 13, 1962 W. J. WILLIAMS ETAL 3,063,709
MOUNT PIN AND SEALING HEAD FOR SEALING MACHINE
Filed Aug. 10, 1960 2 Sheets-Sheet 2
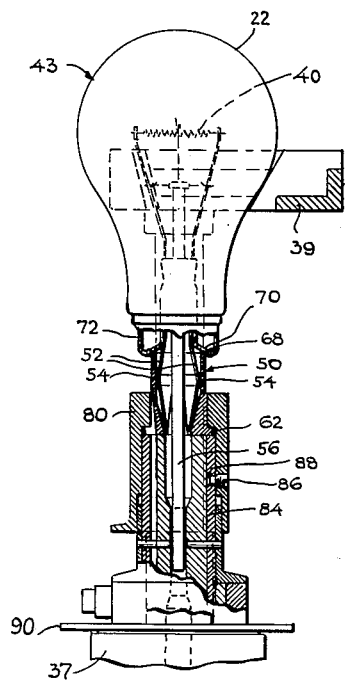
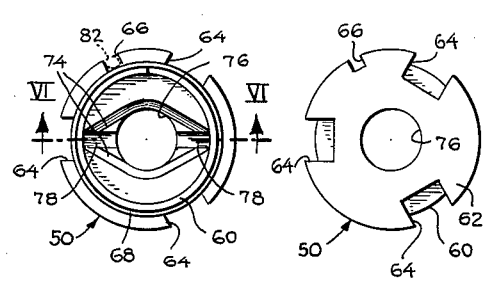
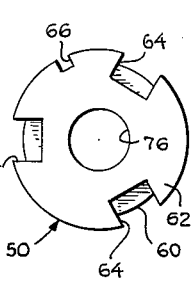
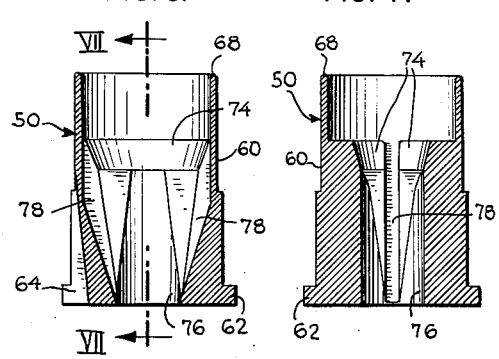
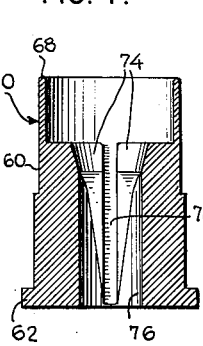
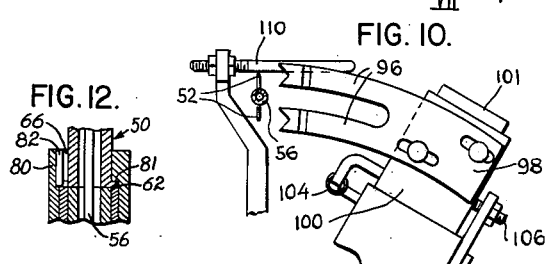
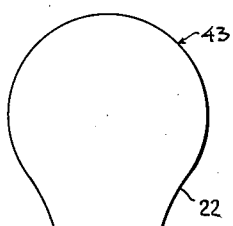
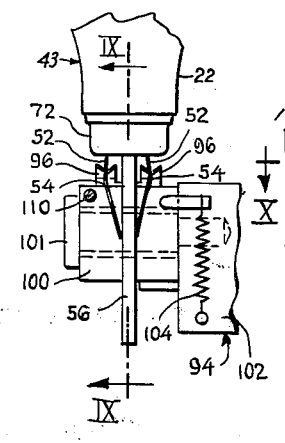
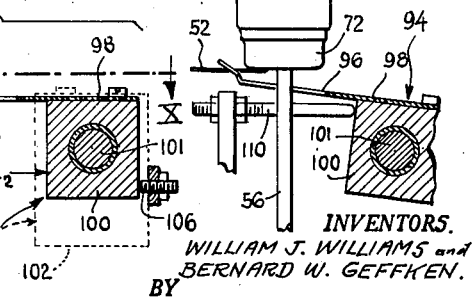
INVENTORS.
WILLIAM J. WILLIAMS and
BERNARD W. GEFFKEN.
BY
ATTORNEY.

United States Patent Office 3,063,709
Patented Nov. 13, 1962

3,063,709
MOUNT PIN AND SEALING HEAD FOR SEALING MACHINE
William J. Williams, Bloomfield, and Bernard W. Geffken, Wayne, N.J., assignors to Westinghouse Electric Corporation, East Pittsburgh, Pa., a corporation of Pennsylvania
Filed Aug. 10, 1960, Ser. No. 48,644
3 Claims. (Cl. 269—287)

The present invention relates to a machine for sealing incandescent and fluorescent lamps, discharge devices and the like, and more particularly, to an improved mount pin, sealing head and bending device for such a sealing machine.

Heretofore, a lehring and sealing machine (of the type shown in copending application Serial No. 733,077, filed May 5, 1958 by William J. Williams et al. and assigned to the same assignee as the present invention) has utilized a cylindrical mount pin which permits the lead wires of a lamp mount to move (during the sealing operation) from a predetermined oriented position in which such mount is fed to the sealing head of the sealing machine. This loss of orientation of the lead wires on the rapidly rotating sealing head occurs particularly during each rapid start and stop of the sealing head before and after each indexing movement of such sealing head. As a result when the sealed lamp is removed from the sealing head by a transfer device for transfer to the exhaust head of an adjacent exhaust machine, the displaced lead wires are not in the proper predetermined position to permit a lead wire bending device of the present invention (disposed adjacent such transfer device) to move the lead wires upwardly and transversely with respect to the longitudinal axis of the sealed lamp. As a result a lead wire which is missed by this bending device is then burned off by the tipping torch at the tipping-off station of the exhaust machine. Further, once the oriented position of the lead wires is lost, automatic threading devices (associated with the basing machine) for performing the lead wire threading operation are also incapable of properly threading the lead wires into the lamp base, thus resulting in a defective finished lamp.

In addition, the conventional mount pin has a relatively large cross section and resultant large mass of metal in contact with the flare of the lamp stem, which large mass of metal rapidly conducts the heat away from the adjacent flare and neck portions of the lamp bulb thereby introducing strains in the resultant lamp seal.

Further, such conventional mount pins are loosely secured to the mount rod by a collar which is in turn pinned to the mount rod. As a result the above-mentioned movement and vibration of the sealing machine causes rotation of the mount pin with respect to the mount rod.

It is the general object of the present invention to avoid and overcome the foregoing, and other difficulties of and objections to prior art practices, by the provision of an improved mount pin for a sealing machine, which mount pin orients and retains the lead wires of a filament mount in a predetermined oriented position during the sealing operation thereby preventing burned-off lead wires at the tipping-off station of an adjacent exhaust machine and insuring the proper threading of such lead wires into a base at a threading station of an associated basing machine.

Another object of the present invention is the provision of an improved mount pin for a sealing machine, which mount pin minimizes the conduction of heat away from the adjacent seal portions of the lamp stem and lamp bulb, thus preventing the introduction of strains into the resultant lamp seal.

A further object of the present invention is an improved mount pin which is oriented and fixed with respect to a reference surface on the sealing head.

A still further object is an improved sealing head which maintains a filament mount in a predetermined oriented position with respect to a reference surface on the sealing head.

Yet another object of the present invention is the provision of a bending device for positioning the lead wires preparatory for exhaust to prevent "burn-off" of such lead wires during the tipping-off operation.

The aforesaid objects of the present invention and other objects which will become apparent as the description proceeds are achieved by providing an improved mount pin having a flare supporting portion of reduced cross section and provided with positioning slots for receiving the oriented lead wires and retaining the oriented position thereof, the slots being provided with an elliptical entrance portion which cams or guides the oriented lead wires into the slots. A locating aperture in the base of the mount pin permits securement of the mount pin in a predetermined oriented position with respect to the mount rod.

The bending device has a bending member rotatably mounted on a mounting means for bending the lead wires laterally and for then rotating vertically to force said lead wires against the seal.

For a better understanding of the present invention reference should be had to the accompanying drawings, wherein like numerals of reference indicate similar parts throughout the several views, and wherein:

FIG. 1 is a vertical-sectional view along the line I—I of FIG. 2 in the direction of the arrows of a portion of a lehring and sealing machine, a transfer device for transferring the sealed lamps from the sealing conveyor to an adjacent exhaust machine and a bending device adjacent the transfer device for positioning the oriented and preformed lead wires of the sealed lamp against the seal and hence away from the path of movement of the tipping-off torch associated with the exhaust machine;

FIG. 3 is a vertical-sectional view along the line III—III of FIG. 2 in the direction of the arrows of a sealing head incorporating the improved mount pin of the present invention;

FIG. 4 is an enlarged plan view of the top of the mount pin shown in FIG. 3;

FIG. 5 is a plan view of the bottom of the mount pin shown in FIG. 3;

FIG. 6 is a vertical-sectional view of the mount pin taken along the line VI—VI of FIG. 4 in the direction of the arrows;

FIG. 7 is a vertical-sectional view of the mount pin along the line VII—VII of FIG. 6 in the direction of the arrows;

FIG. 8 is a side-elevational view of the sealed lamp at the lead-wire bending station of the transfer device and the bending device with portions of the transfer device removed for clarity and showing the bending device in its "starting" position;

FIG. 9 is a vertical-sectional view along the line IX—IX of FIG. 8 in the direction of the arrows;

FIG. 10 is a plan view taken along the line X—X of FIG. 9 in the direction of the arrows;

FIG. 11 is a view similar to FIG. 9 but showing the lead wires and the bending device in their "final" position;

FIG. 12 is a fragmentary vertical-sectional view similar to FIG. 3 but taken through a pin to illustrate the details thereof.

Although the improved mount pin, sealing head and bending device of the present invention are operable with apparatus for sealing incandescent and fluorescent lamps, discharge devices and the like, such mount pin, sealing head and bending device are particularly adapted for use in conjunction with apparatus for sealing incandescent lamps and hence they have been so illustrated and will be described.

Figure 1:
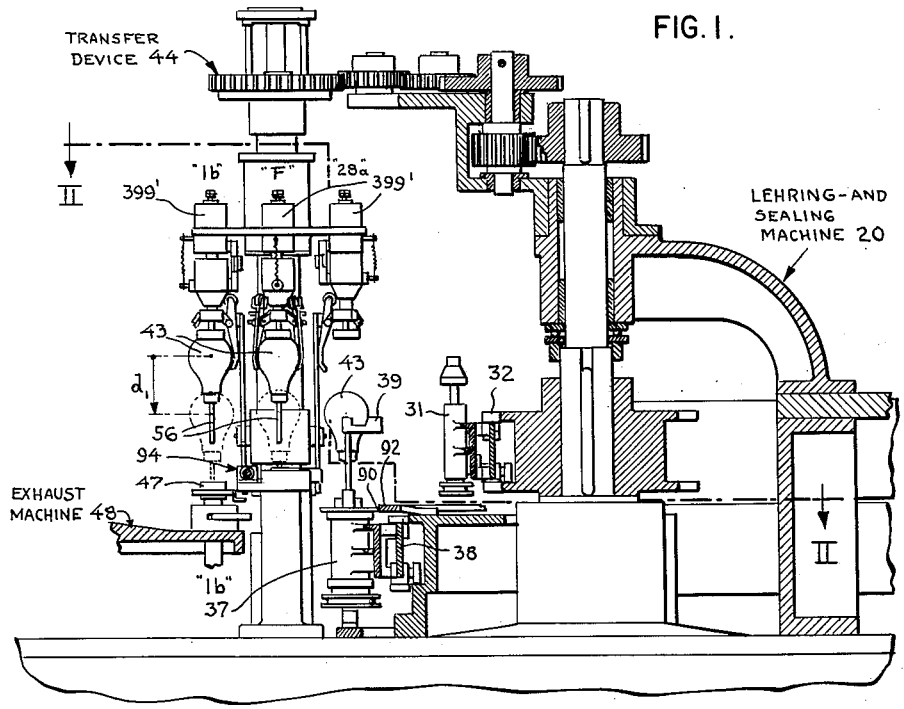
Figure 2:
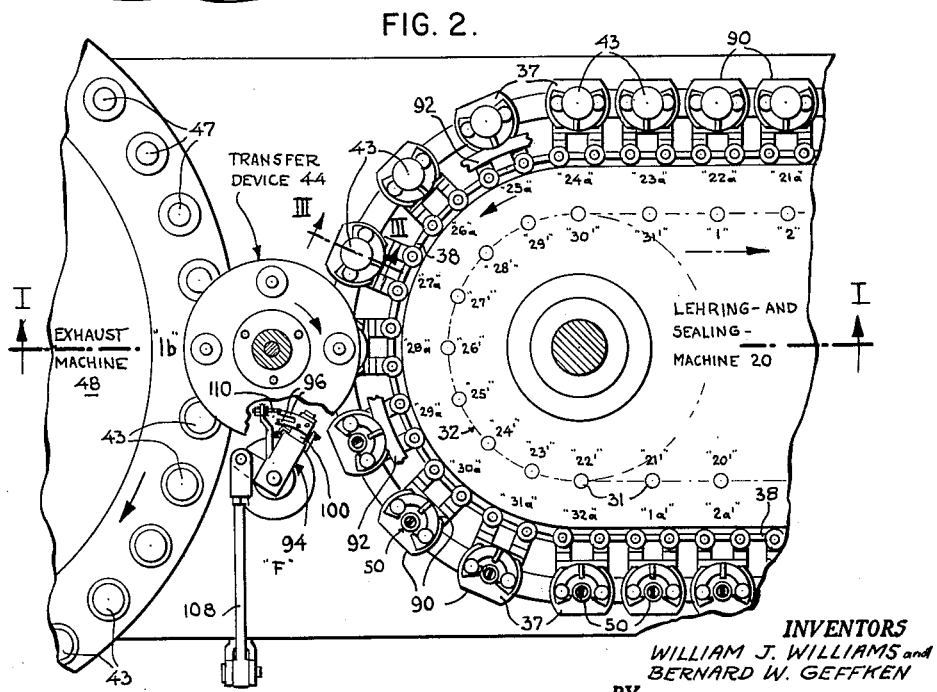
FIG. 2 is a plan view of the lehring and sealing machine, transfer device, exhaust machine and bending device along the line II—II of FIG. 1 in the direction of the arrows.

With specific reference to the form of the present invention illustrated in the drawings and referring particularly to FIG. 1, a lehring and sealing machine (of the type disclosed in the above-mentioned U.S. application Serial No. 733,077) is indicated generally by the reference numeral 20. Suffice it to say that the lehring and sealing machine, as shown in FIGS. 1 and 2, is provided with the novel sealing heads 37 of the present invention with each sealing head carrying a sealed silica-coated incandescent lamp 43 by means of a bulb holder 39 as it moves into the discharge station "28a" of FIG. 2, from which such lamp is picked up by a transfer device 44, as hereinafter described, and then deposited into an exhaust head 47 of an exhaust machine 48.

By reference more particularly to FIGS. 3 to 7, it will be noted that the novel sealing head 37 contains the improved mount pin 50 which is operable to receive preformed lead wires 52 of the filament mount 40 and to orient the preformed lead wires 52 and hence the filament mount 40 in a predetermined position on the sealing head 37. As shown in FIGS. 3 and 8 the depending portion of each of the lead wires 52 is provided with a contact portion, such as a V-shaped bend 54 which defines a contact plane by extending outwardly from the longitudinal axis of the filament mount 40. This bend 54 is utilized to aid the improved mount pin 50 of the present invention to orient the filament mount 40 in the sealing head 37 with the lower portion of each lead-in wire 52 (FIGS. 3 and 8) positioned against the usual tubulation 56 of the filament mount 40.

*Mount Pin*

Such mount pin 50 comprises a generally cylindrical body 60 having a lower flange 62. A plurality of air-vent slots 64 (FIGS. 4, 5 and 6), are disposed in equi-spaced relation about the periphery of the body 60 (herein shown at 120° to each other), extend through the lower flange 62 and taper upwardly in the body 60 to a point adjacent the middle thereof where the upper ends of such air-vent slots 64 coincide with the outer surface of the body 60. In order to provide means for orienting the mount pin 50 on the sealing head 37 with respect to a reference surface 90 on such head 37, the lower flange 62 has locating means, such as a locating slot 66 (FIGS. 4 and 5).

It will be appreciated from a consideration of FIGS. 6 and 7 that an upper flare-supporting portion 68 of the body 60 comprises a thin-walled shell thus minimizing the conduction of heat away from the adjacent vitreous flare 70 (FIG. 3) of the filament mount 40 and away from the neck portion 72 (FIGS. 3 and 8) of the lehred silica-coated bulb 22 and thereby preventing the introduction of deleterious strains in the resultant lamp seal.

Referring now to the interior of the improved mount 50 of the present invention, the upper flare-supporting portion 68 terminates (at its lower end) in guide means, such as a generally elliptical-shaped guide aperture 74 (FIGS. 4, 6 and 7), which aperture 74 tapers downwardly toward an axial tubulation-receiving hole 76 and positioning means, such as a pair of diametrically opopsed lead-wire receiving slots 78 in the body 60. As shown in FIG. 4, the lead-wire receiving slots 78 taper inwardly from top to bottom so that their bottoms terminate in the tubulation-receiving hole 76 at an angle corresponding to the angular disposition of the lower portions of the lead wires 52.

In order to properly orient the mount pin 50 on the sealing head 37 with respect to the above-mentioned reference surface 90, the mount pin 50 is inserted into the bottom of a collar 80 (FIG. 3) so that the upper flare-supporting portion 68 of the mount pin 50 projects through an axial opening in the collar 80 and so that a locating pin 82 (FIGS. 4 and 12), depending below an inner rim 81 (FIG. 12) of such collar 80, projects into the locating slot 66 in the lower flange 62. The assembled collar 80 and mount pin 50 are then positioned on a hollow spindle 84, as shown in FIG. 3, so that a set screw 86 carried by the collar 80 may be aligned with and threaded into a registering hole 88 in the hollow spindle 84, thus gripping the lower portion of the mount pin 50 and securing the mount pin 50 in its predetermined permanent oriented position with respect to the reference surface 90 (FIGS. 1 and 3) on the sealing head 37, for a purpose as hereinafter related.

As the filament mount 40 is deposited in the sealing head 37, the guide aperture 74 first guides the tubulation 56 into the tubulation-receiving hole 76; and then guides the V-shaped bends 54 of the lead wires 52 into the lead-wire receiving slots 78 thereby orienting the filament mount 40 with respect to the permanently oriented mount pin 50. Due to the tapering of the lead-wire slots 78 the lower extremities of the lead wires 52 are positioned against the tubulation 56 as seen in FIGS. 3 and 8. Thereafter, during each rapid start and stop of the sealing head 37, before and after each indexing movement thereof on the lehring and sealing machine 20, the V-shaped bends 54 in the lead wires 52 (which bends 54 are held in the lead-wire receiving slots 78) keep the filament mount 40 in its oriented position on the sealing head 37 and the reference surface 90 (FIGS. 2 and 3) engages a stationary track 92 (FIG. 2) during indexing of the sealing heads 37 to keep them in a predetermined position relative to the sealing conveyor 38 of the lehring and sealing machine 20.

At Station "28a" this sealing conveyor 38 presents the sealed lamp 43 to the transfer device 44 (FIGS. 1 and 2) which then picks up such sealed lamp 43 from the sealing heads 37 and transfers it to the exhaust head 47 of the exhaust machine 48 at Station "1b."

In order to accomplish this transfer of the sealed lamp 43 from the sealing head 37 at Station "28a" to the exhaust head 47, at Station "1b" (FIG. 2), a transfer head 399' of the transfer device 44 adjacent Station "28a" is lowered (from the solid-line position shown in FIG. 1) a distance "$d_1$" to enable it to secure the sealed lamp 43. The transfer head 399' and the sealed lamp 43 are then elevated to clear the sealing head 37 and are indexed in clockwise direction (indicated by the arrow in FIG. 2) to the solid-line position (FIG. 1) at Station "F," the bending station. The transfer head 399' is then lowered to the dotted-line position (FIG. 1) where a bending device 94 (FIGS. 1, 2 and 8–11) bends the oriented lead wires 52 upwardly from the position shown in FIGS. 8 and 9 to the position shown in FIG. 11. In this latter position the bent lead wires 52 are remotely disposed from burner flames so that they will not be burned off during the subsequent tipping-off operation on the exhaust machine 48.

*Bending Device*

As shown in FIGS. 1 and 10, the bending device 94 has a pair of arcuate bending fingers 96 projecting from a bending member, such as an arcuate bending plate 98, adjustably mounted on mounting means, such as a block 100 or the like which is pivoted at 101 (FIGS. 9 and 11) on the end of a bell crank lever 102. This block 100 is normally biased by a spring 104 against a first stop 106 (carried by the bell crank lever 102 below the pivot 101) so that the bending fingers 96 are normally disposed in the horizontal position shown in FIG. 9.

The drive means utilized to oscillate the bell crank lever 102 and the bending fingers 96 between the positions shown in FIG. 9 and FIG. 11, comprises a connecting rod 108 (FIG. 2) and conventional cam driven linkage.

As the bending fingers 96 are rotated in counterclockwise direction (FIG. 10) in a horizontal plane (through a distance "$d_2$," FIG. 9) from the starting position (FIGS. 8-10) to their final position (FIG. 11), such bending fingers 96 first engage the oriented lead wires 52 and then move the latter to the left, as viewed in FIGS. 9 and 11. At the end of this counterclockwise movement the block 100 engages a second stop 110 disposed above the axis of pivot 101. The continued motion of the drive means causes the second stop 110 to rock such block 100 and the bending fingers 96 carried thereby (against the action of the spring 104) in clockwise direction about the pivot 101, as viewed in FIG. 11, and away from the first stop 106 to push the lead wires 52 against the seal of the sealed lamp 43.

Thereafter the bending device 94 is retracted to permit vertical upward movement of the transfer head 399' and the sealed lamp 43 from the dotted-line position (FIG. 1) to the solid-line position. The transfer head 399' and sealed lamp 43 then index to a position adjacent Station "$1b$" of the exhaust machine 48 where the sealed lamp 43 is transferred to the exhaust head 47 with the bend lead wires 52 still oriented in a predetermined position.

It will be recognized by those skilled in the art that the objects of the present invention have been achieved by the provision of an improved mount pin for the sealing head of a sealing machine, which mount pin orients the lead wires of a filament mount and hence the filament mount itself in a predetermined position thereby permitting bending of such lead wires during a transfer operation to a poistion where they will not be subsequently burned off at the tip-off station of an adjacent exhaust machine and facilitating the threading of such lead wires into a base at a threading station of an associated basing machine. In addition, such improved mount pin minimizes the conduction of heat away from the adjacent sealed portions of the lamp stem and lamp bulb during the sealing operation thereby preventing the introduction of stains into the lamp seal. Further, the improved mount pin is provided with means which enable it to be oriented in a predetermined fixed position with respect to a reference surface on the supporting sealing head where it is maintained in such oriented position.

The bending device of the present invention is operable to bend the lead wires of a sealed lamp away from the tubulation of the lamp and then against the seal thereof while moving such lead wires further away from the tubulation.

While in accordance with the patent statutes a preferred embodiment of the present invention has been illustrated and described in detail, it is to be particularly understood that the invention is not limited thereto or thereby.

We claim:

1. A mount pin for a sealing head of a sealing machine and operable to orient a filament mount having a vitreous flare with lead-in wires extending therefrom and each of said lead-in wires being provided with a contact portion, said mount pin comprising, a hollow body having a thin-walled shell portion presenting an interior surface and formed to support the vitreous flare of said filament mount thus minimizing heat conduction away from the vitreous flare of said filament mount during the sealing operation and preventing introduction of strains into the resultant lamp seal, and said body provided with spaced positioning means on the said interior surface portion thereof to receive and orient the contact portions of said lead-in wires to orient said mount on said mount pin and retain the oriented position of said mount during the sealing operation.

2. The mount pin as specified in claim 1, wherein said body is further provided with locating means to permit location of said mount pin on said sealing head in a predetermined position.

3. A sealing head for orienting a filament mount having a vitreous flare and lead-in wires extending therefrom with each lead-in wire being provided with a contact portion, said sealing head having a reference surface, a hollow mount pin having a thin-walled shell portion presenting an interior surface and formed to support the vitreous flare of said filament mount, said mount pin provided with spaced positioning means on the said interior surface portion thereof to receive and orient the contact portions of said lead-in wires to orient said mount on said mount pin, said mount pin also provided with locating means to permit location of said mount pin on said sealing head in a predetermined oriented position, and mounting means gripping the lower portion of said hollow mount pin and also engaging with said locating means providing on said mount pin to affix said mount pin to said sealing head in predetermined oriented position, whereby the filament mount carried by said mount pin is oriented wtih respect to said reference surface.

References Cited in the file of this patent

UNITED STATES PATENTS

| | | |
|---|---|---|
| 925,446 | Beeber | June 22, 1909 |
| 2,336,541 | Gunter et al. | Dec. 14, 1943 |
| 2,350,220 | Ehret | May 30, 1944 |
| 2,366,786 | Herzog | Jan. 9, 1945 |
| 2,396,801 | Morand | Mar. 19, 1946 |
| 2,484,688 | Crowley | Oct. 11, 1949 |
| 2,595,058 | Daley | Apr. 29, 1952 |
| 2,660,004 | Daley | Nov. 24, 1953 |
| 2,671,986 | Wiener | Mar. 16, 1954 |
| 2,685,762 | Mullan | Aug. 10, 1954 |
| 2,765,002 | Reynolds | Oct. 2, 1956 |
| 2,916,056 | O'Brien et al. | Dec. 8, 1959 |

FOREIGN PATENTS

| | | |
|---|---|---|
| 385,537 | Great Britain | Dec. 29, 1932 |
| 589,232 | Germany | Dec. 8, 1933 |